(12) United States Patent
Davy et al.

(10) Patent No.: US 8,417,995 B2
(45) Date of Patent: Apr. 9, 2013

(54) METHOD AND SYSTEM FOR MANAGING ELECTRICAL POWER SUPPLY OUTAGES ON BOARD AN AIRCRAFT

(75) Inventors: Arnaud Davy, Pechbonnieu (FR); Laurent Peyras, Toulouse (FR); David Rousset, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/666,917

(22) PCT Filed: Jun. 24, 2008

(86) PCT No.: PCT/FR2008/051140
§ 371 (c)(1),
(2), (4) Date: Sep. 20, 2010

(87) PCT Pub. No.: WO2009/007591
PCT Pub. Date: Jan. 15, 2009

(65) Prior Publication Data
US 2011/0047399 A1    Feb. 24, 2011

(30) Foreign Application Priority Data
Jun. 29, 2007   (FR) ..................................... 07 56176

(51) Int. Cl.
*G06F 11/00* (2006.01)
(52) U.S. Cl. .............. 714/26; 714/25; 714/48; 714/47.2
(58) Field of Classification Search .................... 714/14, 714/26, 47.2, 25, 48
See application file for complete search history.

(56) References Cited

U.S. PATENT DOCUMENTS

| | | | |
|---|---|---|---|
| 5,180,927 A * | 1/1993 | Poletto | 327/198 |
| 2003/0204777 A1* | 10/2003 | Kojori | 714/14 |

FOREIGN PATENT DOCUMENTS

| | | |
|---|---|---|
| DE | 29705503 U1 | 6/1997 |
| DE | 10027381 | 1/2002 |
| EP | 1160650 A | 12/2001 |
| JP | 06342322 A | 12/1994 |
| JP | 08313564 A | 11/1996 |
| RU | 51250 U1 | 1/2007 |
| WO | 2003094319 A2 | 11/2003 |

OTHER PUBLICATIONS

International Search Report dated Jan. 28, 2009.

* cited by examiner

*Primary Examiner* — Scott Baderman
*Assistant Examiner* — Sarai Butler
(74) *Attorney, Agent, or Firm* — Perman & Green, LLP

(57) ABSTRACT

A method of managing an electrical power supply outage on board an aircraft, including the following operations: —detection of an electrical power supply outage, —measurement of a duration of the power supply outage by measuring a discharge time of a capacitor and comparing this measured duration with a threshold duration, —saving a long outage indication when the duration of the outage is greater than a threshold duration. The disclosed embodiments also relates to a system implementing this method and including: —a circuit for detecting an electrical power supply outage, —a circuit for measuring a duration of the power supply outage, and—a circuit for managing indications able to manage emissions of signals according to the measured duration of the power supply outage.

10 Claims, 1 Drawing Sheet

METHOD AND SYSTEM FOR MANAGING ELECTRICAL POWER SUPPLY OUTAGES ON BOARD AN AIRCRAFT

CROSS-REFERENCE TO RELATED APPLICATIONS

This application is the National Stage of International Application No. PCT/FR2008/051140 International Filing Date, 24 Jun. 2008, which designated the United States of America, and which International Application was published under PCT Article 21 (s) as WO Publication No. WO2009/007591 A2 and which claims priority from, and the benefit of, French Application No. 200756176 filed on 29 Jun. 2007, the disclosures of which are incorporated herein by reference in their entireties.

BACKGROUND

The aspects of the disclosed embodiments concern a system for managing failures in the electric power network of avionic equipment. This system makes it possible to tell whether electric power failures are short or long, and to turn off the onboard computer when the failure is long. The aspects of the disclosed embodiments also concern a process used by this system.

The system has applications in the field of aeronautics, especially in the field of managing electric power onboard an aircraft.

SUMMARY

Onboard an aircraft, there are generally several sources of electric power that make it possible to power different kinds of equipment onboard the aircraft, especially the onboard computer. These electric power sources generally supply 28 volts of power. These different power sources can be substituted for one another, for example, when one of the sources is faulty. These different power sources are generally connected to the network by means of an automatic routing system, so it is possible to move from one power source to another based on what the avionic equipment needs. However, when there is a change in the power source, an electric power failure can occur on said network. This power failure can be one of several kinds:

There are so-called transparent power failures. These failures last less than 200 milliseconds. They are related to the behavior of the electric power network and generally occur in flight.

There are short power failures. These short failures last less than 5 seconds. Like the transparent failures, these short failures are related to the behavior of the electric power network. They are detected in flight.

There are also long failures that last more than 5 seconds. These long failures occur on the ground, when the aircraft is in the maintenance phase. These long failures are used by maintenance agents to repair, check or test certain equipment in the aircraft.

When the failure is short, the onboard computer shuts down the moment it is not powered electrically. However, since the aircraft is in flight, the computer must be able to reboot very quickly, i.e., it must be able to run as soon as the electric power comes back on.

When the failure is long, the onboard computer also shuts down the moment it is not powered electrically. But, in this case, the onboard computer must perform a series of tests when it is turned back on to check the general operation of the equipment. Since the aircraft is on the ground, in the maintenance phase, the computer can reboot slowly while performing a series of so-called self-tests.

Understandably, therefore, when there is an electric power failure in an aircraft, it is important to know whether it is a transport or short failure or if it is a long failure in order to control the subsequent rebooting of the computer.

Since short failures and transparent failures require the same fast rebooting of the computer, they will be treated the same in the following description and will be called "short failures" without distinction.

In the case of a long failure, it is important to back up information from a long failure, that is, information specifying that the electric power failure is a long one and that it will entail rebooting the computer with self-tests. It is therefore necessary to store this long-failure information until the system takes it into account, i.e., until the computer reboots.

Currently, when there is a power failure in the system, the avionic equipment goes into initialization mode and a timer goes off. During this failure, the avionic equipment runs on an internal power source in the equipment, for example, a battery. This battery can supply only a limited amount of electricity, so to limit the consumption of electricity, only certain functionalities of the equipment are powered. The equipment then runs in low-power mode.

One of these functionalities is measuring the time until the end of the power failure. Thus, the timer should be able to be powered electrically by the internal battery for the entire period of a short failure, i.e., around 5 seconds. If the electric power comes back on before the end of 5 seconds, the computer then reboots by the fast method (without self-tests), the avionic equipment switches back over to the power system, the timer is reinitialized and the internal battery is recharged.

If the electric power does not come back on before the end of the 5 seconds, then long power-failure information is saved in a non-volatile memory. By storing information on a long failure, it is possible to turn on the computer and keep it on during the entire long-failure period, which makes it possible to reduce the consumption of electricity of the equipment somewhat. However, storing this information in the non-volatile memory requires constant power to said non-volatile memory, as well as a programmable electronic component that manages the storage. The programmable component is a relatively high energy consumer.

Understandably, then, in the current process, certain functionalities of the equipment, like the timer and the programmable component, must be powered by the internal battery for a period of 5 seconds, which entails a relatively high consumption of electricity compared to the capacity of the internal battery. This internal battery also takes up a rather large amount of space, which is larger the higher its capacity.

Moreover, the system for managing power failures in the prior art has a complex architecture from the standpoint of managing the energy and switching.

The aim of the disclosed embodiments is to fix these disadvantages in the techniques just described. For this purpose, the disclosed embodiments propose a system and a process that make it possible to measure the duration of the power failure by the discharge of a condenser. During this discharge, the condenser need not be powered electrically, which makes it possible to turn off the computer during the entire period of the electric failure. This measurement of time by the discharge of a condenser makes it possible to do without any internal power source.

More precisely, the disclosed embodiments concern a process for managing an electric power failure onboard an aircraft, characterized by the fact that it includes the following operations:

detecting an electric power failure, measuring the length of the power failure by measuring the time it takes for a condenser to discharge and comparing the time measured with a threshold time, saving information on a long failure when the length of the failure is longer than a threshold time.

The process in the disclosed embodiments can also include one or more of the following characteristics:

the condenser is recharged as soon as an active switching signal is received at the input of a switch connected in series to the condenser;

the active switching signal is triggered almost immediately when the length of the failure is less than the threshold time;

when the length of the failure is more than the threshold time, the active switching signal is triggered upon receipt of an end-of-save signal;

the discharge time is measured by comparing the voltage value at the condenser terminals with a reference voltage value.

The disclosed embodiments also concern a system for managing an electric power failure onboard an aircraft.

The system for managing an electric power failure onboard an aircraft is characterized by the fact that it includes:

a circuit for detecting an electric power failure, a circuit for measuring the length of a power failure that can measure the condenser discharge time and compare the time measured with a threshold time, and a circuit for managing information that can manage the sending of signals so that long power-failure information is saved when the failure time is longer than the threshold time.

The system in the disclosed embodiments may include one or more of the following characteristics:

the measurement circuit has a condenser connected, on one hand, to an input of a comparator and, on the other hand, to an auxiliary power source via a switch;

the management circuit has a programmable component capable of receiving output information from the measurement circuit, sending a save signal to a central processing unit, receiving an end-of-save signal from the central processing unit and sending a switching signal to the measurement circuit; the signals that are sent depend on the signals that are received;

the measurement circuit and the management circuit are mounted on an electric power card of an onboard computer, and the management circuit can communicate with a central processing unit.

The disclosed embodiments also concern an aircraft that has a system like the one just described.

DETAILED DESCRIPTION

The disclosed embodiments propose a system and a process that make it possible to manage electric power failures onboard an aircraft in such a way that the computer can be completely shut down as soon as a network power failure occurs, allowing the length of time of the failure to be measured and, if need be, long-term failure information to be saved.

The process in the disclosed embodiments proposes, when a power failure is detected, measuring the length of time of the failure. The length of the failure is measured by measuring the discharge time of a condenser. The discharge time of the condenser is determined from the voltage value at the condenser terminals. This voltage value is compared to a reference voltage that corresponds to a discharge time of 5 seconds. Comparing the voltages is the equivalent of comparing the length of the failure with a threshold time, for example 5 seconds.

When the voltage value of the condenser is higher than the reference voltage, it means that the failure is short. On the contrary, when the voltage value of the condenser is less than the reference value, it means that the failure is long.

When a time less than 5 seconds is detected, the condenser is immediately recharged so it can measure the length of a potential new failure.

When a time greater than 5 seconds is detected, the long failure information is saved in a way that will be described later on. The condenser is recharged only after it receives an end-of-save command.

Figure 1:
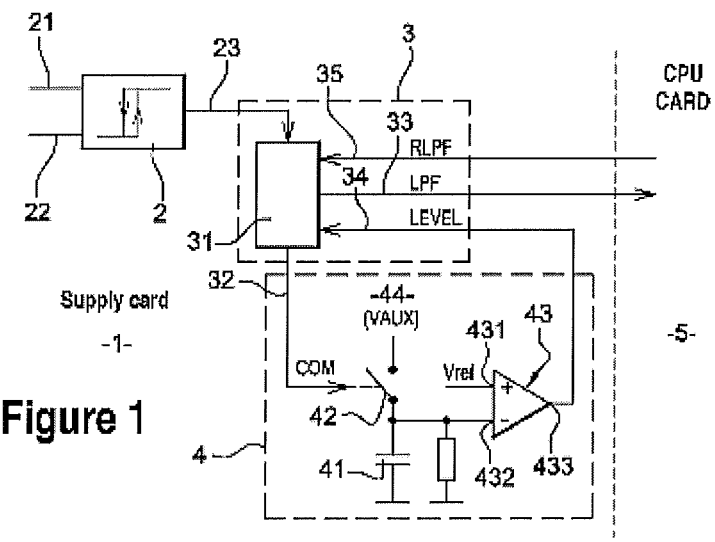
FIG. 1 is a schematic view of the electronic circuit in the disclosed embodiments to manage an electric power failure without an internal power source.

An example of an electronic circuit that makes it possible to use the process in the disclosed embodiments is shown in FIG. 1. This electronic circuit is mounted on a power card 1 of the onboard computer of the aircraft. This electronic circuit has a circuit 2 for detecting an electric power failure. This detection circuit 2 has an input 21 coming from the electric power network; it thus receives electric voltage of 28 volts from the network. This detection circuit 2 also has an input 22 connected to the ground.

This circuit 2 is capable of detecting the presence, on its input 21, of a voltage of 28V. When no voltage of 28 V is detected, it means that there is an electric power failure in the network. In other words, the detection circuit 2 detects the power failures. When the end of a failure is detected, it sends failure information to an information management circuit 3. This information management circuit 3 has a programmable electronic component 31 with a plurality of functionalities built in. This programmable component 31 is capable of receiving different information signals and sending command signals, based on the signals received. This programmable component is a logic component that receives and sends logic signals that can be active or inactive. The logic signals can have binary values 0 or 1. In the following description, an active logic signal will be considered to have the binary value 1 and an inactive logic signal a binary value of 0, it being understood that the binary values can be reversed.

The programmable component 31 is connected, via a switching output 32, to a measurement circuit 4 for measuring the length of time of the power failure.

This measurement circuit 4 has a condenser 41 that can load power and discharge that power later on. To do so, the condenser 41 is connected in series to a power source 44, for example an auxiliary source (Vaux). This auxiliary power source 44 has the role of charging the condenser, under certain conditions, when the power network is not cut. The charging and discharging conditions of the condenser will be defined later on.

The condenser 41 is connected to this auxiliary power source 44 by a switch 42 acting on a switching signal 32 (COM) sent by the programmable component 31. It is also connected directly to a voltage comparator 43.

This voltage comparator 43 receives, on its first input 431, a reference voltage Vref and, on a second input 432, the discharge voltage of the condenser 41, also called the residual voltage of the condenser. It thus compares the voltage at the terminals of the condenser 41 with the reference voltage Vref.

The comparator 43 has an output 433 connected to an input of the programmable component 31. This output 433 sends an information signal 33 (LEVEL) on the results of the voltage comparison. The signal sent at the output of the comparator 43 is a binary signal that can be active or inactive. When the condenser voltage is higher than the reference voltage, the LEVEL signal is inactive (it is 0). On the other hand, when the condenser voltage is less than the reference voltage, the LEVEL signal is active (it is 1). This LEVEL signal 33 is sent to an input of the programmable component 31. Based on this signal, the programmable component 31 sends an active switching signal COM to the switch 42 of the measurement circuit 4, immediately or later, depending on the case.

More precisely, after a failure, as soon as the detection circuit 2 detects the presence of a functional voltage of 28 volts (which corresponds to the end of the power failure), the programmable component 31 forces its switching output 32 to 0. The switch 42 remains open. While the switch is open, the condenser 41 discharges. The voltage at the condenser 41 terminals is then compared, by the comparator 43, with the reference voltage Vref. This reference voltage Vref can be 1 volt, for example.

If the voltage at the condenser terminals is higher than the reference voltage Vref, then the power failure is considered short, that is, less than 5 seconds. In this case, the LEVEL signal obtained at the output 433 of the comparator 43 is 0. When the programmable component 31 receives this LEVEL signal at 0, it sends the central processing unit card 5 of the onboard computer, called the CPU card, a long power failure (LPF) signal 34 at 0. This inactive state of the LPF signal means that the failure was short. This LPF signal (active or inactive) is obtained by reinitializing the computer, i.e., by releasing the reset button on the computer. When the LEVEL signal is at 0, the programmable component 31 sends a switching signal COM at 1. When the COM signal is 1, the switch 42 closes. The condenser 41 is then recharged by the auxiliary source 44. As soon as the condenser is recharged, the system is ready to measure the length of the next failure.

In one embodiment of the disclosed embodiments, the condenser has a capacity of around 10 microfarads. In effect, the condenser capacity is chosen based on the length of the failure to be measured. For example, for a length of 5 seconds, a 10 microfarad condenser can be used.

If the voltage at the condenser terminals is less than the reference voltage Vref, then the power failure is considered long. In this case, the LEVEL signal obtained at output 433 of the comparator 43 is on 1. When it receives the LEVEL signal on 1, the programmable component 31 sends the CPU card 5 a long power failure LPF signal at 1. This active LPF signal means that the power failure was long. During this time, the COM signal of the programmable component 31 remains inactive. The condenser 41 thus remains discharged. If a new power failure occurs, since the condenser is not recharged, the system will always indicate that it is a long failure. In other words, the long power failure information is saved by the measurement circuit 4, since it can take measurements only after said long failure has been taken into account.

When the long power-failure information has been taken into account by the CPU card, it sends an RLPF (reload long power failure) signal 35 to the programmable component 31. This RLPF signal means, for the programmable component 31, that the long power-failure information has been taken into account and that the self-tests have been performed. This RLPF signal means, consequently, that the saving of the long failure information is finished and that said long failure information can be erased. On receiving this RLPF signal, the programmable component 31 sends a COM signal to 1. On receiving this COM signal, the switch 42 closes again, which allows the condenser 41 to recharge from the auxiliary source 44. The system is then again ready to measure the next failure.

Thus, while there is electric power, the condenser charges, then remains charged. When a failure occurs, the power in the condenser is interrupted, and the condenser discharges. The length of the discharge of the condenser tells the length of the power failure. When the failure is short, the condenser is recharged almost immediately after the end of the failure. When the failure is long, the long failure information is saved by the measurement circuit itself. The condenser is then recharged as soon as the central processing unit 5 signals that the self-tests have been performed.

In this way, the central processing unit 5 knows that the failure is long and that self-tests must be performed when the computer reboots. Receiving an active LPF signal means that the failure is long. The computer can therefore be rebooted with the self-tests necessary after a maintenance phase. Not receiving any LPF signal (that is, an inactive LPF signal) means either that there is no electric power failure or that the electric power failure is short and that, consequently, the computer must reboot as soon as possible after the electric power comes back on.

During the entire length of the long failure, the measurement circuit is open and the condenser discharged. Therefore no other measurement of a power failure is possible during this time. After a long failure, the measurement circuit is closed only after receiving the RLPF signal, which allows the condenser to recharge until the next power failure.

Figure 2:
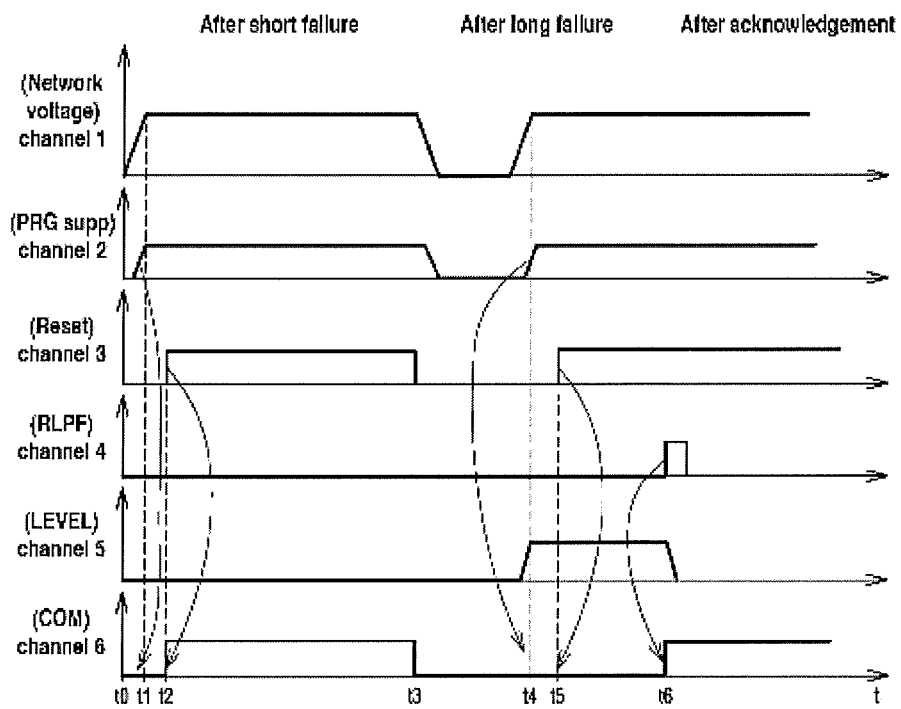
FIG. 2 is a timing diagram of the different signals encountered inside the electronic circuit in FIG. 1.

FIG. 2 shows an example of a timing diagram showing different signals in the circuit in FIG. 1, when there is a long failure and a short failure. Channel 1 of the timing diagram shows the network voltage, channel 2 shows the supply voltage of the programmable component, channel 3 shows the pulse for reinitializing the computer, channel 4 shows the RLPF acknowledgement signal for a long failure, channel 5 shows the LEVEL output signal of the comparator and channel 6 shows the switching signal COM.

Each of these 6 channels shows a signal after a short failure (between t0 and t3), during and after a long failure (between t3 and t6) and after acknowledgement (from t6), that is, after the central processing unit has returned an end-of-save order on long power-failure information.

At t0, after a short failure, the network voltage (channel 1) goes back up to a level of 28 volts (at t1). The programmable component (channel 2) recovers a supply voltage of 28 volts, just after the end of the power failure. It is then resupplied with a voltage of 28 volts. After a few moments, at t2, the computer is reinitialized (channel 3), i.e., the computer reboots. The RLPF signal is inactive, as is the LEVEL signal. The switching signal COM (channel 6) goes into the active state at t2, that is, at the time when the computer is reinitialized.

At t3, a long failure starts. The network voltage (channel 1) goes down to 0. Similarly, with a slight time lag, the supply voltage of the programmable component (channel 2) goes down to 0. All other channels on the timing diagram are also at 0.

At t4, the long failure ends. The network voltage goes back to 28 volts. With a slight time lag, the supply voltage of the programmable component goes back to its active level. Several moments later, at t5, the computer is reinitialized (channel 3). At t4, at the time when the programmable component is resupplied, the LEVEL signal goes into the active state. As long as the LEVEL signal is active, the COM signal is at 0. At t6, an RLPF signal is sent. The LEVEL signal then goes back to 0, and the COM signal goes to 1.

In the disclosed embodiments, the programmable component is preferably chosen so as to guarantee that its outputs are at the low level or the high level during the phase when the power is going up, which makes it possible to be sure that the power-up does not control the switch through the switching signal.

After acknowledgement, i.e., after the central processing unit has sent an RLPF signal for end-of-save information on a long-power failure, the network voltage is at a constant 28 volts. The supply voltage of the programmable component is also at its high level. The re-initialization reset signal of the computer is at 1, which means that the computer is supplied and that it is running properly. The RLPF signal goes back to 0, as does the LEVEL signal. The switching signal COM remains at 1.

It is understood from the preceding that the programmable component of the system in the disclosed embodiments can be a simple component, without a meter. It can be a modern component, for example a power sequencer, relatively inexpensive and reliable compared to the low-power consumption components in the prior art.

Moreover, with the disclosed embodiments, the power card on which the electronic circuit in FIG. 1 is mounted is relatively small and not very heavy. This power card takes a low supply current, and particularly boot-up current, compared to the prior art due to the low-capacity energy reserve.

What is more, the system in the disclosed embodiments requires no non-volatile memory, or any management of a low-consumption mode, which simplifies its architecture. In the invention, the long power-failure information is not stored in a memory, but is saved intrinsically by the condenser in its discharge phase.

The invention claimed is:

1. A process for managing an electric power failure onboard an aircraft, the process comprising:
   detecting an electric power failure,
   measuring the length of the power failure by measuring the discharge time of a condenser and comparing the time measured with a threshold time,
   saving information on a long power failure when the length of the failure is longer than a threshold time.

2. The process according to claim 1, wherein the condenser is recharged as soon as an active switching signal is received at the input of a switch connected in series to the condenser.

3. The process according to claim 2, wherein the active switching signal is sent when the length of the failure is shorter than the threshold time.

4. The process according to claim 2, wherein when the length of the failure is longer than the threshold time, the active switching signal is sent upon receipt of an end-of-save signal.

5. The process according to claim 1, wherein the discharge time is measured by comparing a voltage value at the condenser terminals to the reference voltage value (Vref).

6. A system of managing an electric power failure onboard an aircraft, the system comprising:
   a detection circuit for detecting an electric power failure,
   a measurement circuit for measuring the length of a power failure that can measure the discharge time for a condenser and compare the time measured with a threshold time, and
   a management circuit for managing information that can manage the sending of signals so that long power-failure information is saved when the failure time is longer than the threshold time.

7. The system according to claim 6, wherein the measurement circuit has a condenser connected, on one hand, to an input of a comparator and, on the other hand, to a power source via a switch.

8. The system according to claim 6, wherein the management circuit has a programmable component capable of:
   receiving output information from the measurement circuit,
   sending a save signal to a central processing unit,
   receiving an end-of-save signal from the central processing unit, and
   sending a switching signal to the measurement circuit, with the signals sent depending on the signals received.

9. The system according to claim 6, wherein the measurement circuit and the management circuit are mounted on an electric power card of an onboard computer, and the management circuit can communicate with a central processing unit.

10. An aircraft, comprising the system for managing an electric power failure according to claim 6.

* * * * *